(12) United States Patent
Serna et al.

(10) Patent No.: US 11,785,025 B2
(45) Date of Patent: Oct. 10, 2023

(54) THREAT DETECTION WITHIN INFORMATION SYSTEMS

(71) Applicant: Bank of America Corporation, Charlotte, NC (US)

(72) Inventors: Daniel Joseph Serna, The Colony, TX (US); Marcus Raphael Matos, Richardson, TX (US); Patrick N. Lawrence, Pensacola, FL (US); Christopher Lee Danielson, Poway, CA (US)

(73) Assignee: Bank of America Corporation, Charlotte, NC (US)

( * ) Notice: Subject to any disclaimer, the term of this patent is extended or adjusted under 35 U.S.C. 154(b) by 240 days.

(21) Appl. No.: 17/231,644

(22) Filed: Apr. 15, 2021

(65) Prior Publication Data

US 2022/0337601 A1 Oct. 20, 2022

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/102* (2013.01); *H04L 63/107* (2013.01)

(58) Field of Classification Search
CPC . H04L 63/1416; H04L 63/102; H04L 63/107; G06N 20/00
See application file for complete search history.

(56) References Cited

U.S. PATENT DOCUMENTS

| 7,506,371 | B1 | 3/2009 | Ben-Natan |
| 8,056,130 | B1 | 11/2011 | Njemanze et al. |
| 8,356,001 | B2 | 1/2013 | Collazo |
| 8,793,790 | B2 | 7/2014 | Khurana et al. |
| 8,856,936 | B2 | 10/2014 | Datta Ray et al. |
| 8,955,138 | B1 | 2/2015 | Mahadik et al. |

(Continued)

FOREIGN PATENT DOCUMENTS

| EP | 3023852 B1 | 5/2017 |
| WO | 2016097998 A1 | 6/2016 |

OTHER PUBLICATIONS

Serna, J. D. et al., "Threat Detection and Prevention for Information Systems," U.S. Appl. No. 17/231,456, filed Apr. 15, 2021, 29 pages.

(Continued)

*Primary Examiner* — Robert B Leung (57) ABSTRACT

A device that is configured to receive user activity information that includes information about user interactions with a network device for a plurality of users. The device is further configured to receive a set of bad actor candidates that identifies one or more users from among the plurality of users. The device is further configured to filter the user activity information based on the set of bad actor candidates. The device is further configured to input the filtered user activity information into a machine learning model. The machine learning model is configured to receive the filtered user activity information and to output system exposure information that identifies network security threats. The device is further configured to identify network security actions based on the network security threats and to execute the network security actions.

20 Claims, 3 Drawing Sheets

(56) References Cited

U.S. PATENT DOCUMENTS

| | | |
|---|---|---|
| 9,047,464 B2 | 6/2015 | Sambamurthy et al. |
| 9,141,790 B2 | 9/2015 | Roundy et al. |
| 9,166,997 B1 | 10/2015 | Guo et al. |
| 9,177,139 B2 | 11/2015 | Hull Roskos |
| 9,306,962 B1 * | 4/2016 | Pinto .................. H04L 63/1416 |
| 9,367,872 B1 | 6/2016 | Visbal et al. |
| 9,372,915 B2 | 6/2016 | Long et al. |
| 9,378,361 B1 | 6/2016 | Yen et al. |
| 9,454,785 B1 | 9/2016 | Hunter et al. |
| 9,456,054 B2 | 9/2016 | Jacobson et al. |
| 9,460,303 B2 | 10/2016 | MacLeod et al. |
| 9,576,130 B1 * | 2/2017 | Book ........................ G06F 21/57 |
| 9,690,931 B1 | 6/2017 | Anantharaju et al. |
| 9,693,195 B2 | 6/2017 | Wootton et al. |
| 9,870,454 B2 | 1/2018 | Botti et al. |
| 9,979,740 B2 | 5/2018 | Christian |
| 10,064,014 B2 | 8/2018 | Wootton et al. |
| 10,140,453 B1 | 11/2018 | Fridakis |
| 10,417,845 B1 | 9/2019 | Lucy et al. |
| 10,447,712 B2 | 10/2019 | Visbal et al. |
| 10,459,593 B2 | 10/2019 | Tiwari et al. |
| 10,516,689 B2 | 12/2019 | Christian |
| 10,523,698 B2 | 12/2019 | Christian |
| 10,542,026 B2 | 1/2020 | Christian |
| 10,606,963 B2 | 3/2020 | Tiwari et al. |
| 10,685,107 B2 | 6/2020 | Norvill et al. |
| 10,708,296 B2 | 7/2020 | Apostolescu et al. |
| 10,826,932 B2 | 11/2020 | Abbaszadeh et al. |
| 10,848,514 B2 | 11/2020 | Christian |
| 10,887,330 B2 | 1/2021 | Christian |
| 10,891,816 B2 | 1/2021 | Florentino et al. |
| 10,931,682 B2 | 2/2021 | Ezra et al. |
| 2004/0064731 A1 * | 4/2004 | Nguyen ............... H04L 63/0263 709/224 |
| 2005/0099288 A1 | 5/2005 | Spitz et al. |
| 2007/0083928 A1 | 4/2007 | Mattsson et al. |
| 2007/0143851 A1 | 6/2007 | Nicodemus et al. |
| 2008/0301120 A1 | 12/2008 | Zhu et al. |
| 2010/0097213 A1 | 4/2010 | Bajpay et al. |
| 2011/0039237 A1 | 2/2011 | Skare |
| 2012/0158454 A1 * | 6/2012 | Saunders ........... G06Q 10/0635 709/224 |
| 2013/0086261 A1 * | 4/2013 | Lim ........................ G06F 16/93 709/224 |
| 2013/0133024 A1 | 5/2013 | MacLeod et al. |
| 2015/0334458 A1 | 11/2015 | Srinivasan et al. |
| 2016/0164892 A1 * | 6/2016 | Satish ................ H04L 63/0236 726/23 |
| 2016/0306965 A1 * | 10/2016 | Iyer .................... G06Q 10/0635 |
| 2016/0380938 A1 * | 12/2016 | O'Connor ........... G06Q 10/107 709/206 |
| 2018/0234444 A1 | 8/2018 | Kaplan et al. |
| 2018/0293377 A1 | 10/2018 | Tomonaga |
| 2019/0207960 A1 | 7/2019 | Chu et al. |
| 2020/0327222 A1 * | 10/2020 | Chhabra ............. H04L 63/0421 |

OTHER PUBLICATIONS

Serna, J. D. et al., "Detecting Bad Actors Within Information Systems," U.S. Appl. No. 17/231,546, filed Apr. 15, 2021, 28 pages.

* cited by examiner

THREAT DETECTION WITHIN INFORMATION SYSTEMS

TECHNICAL FIELD

The present disclosure relates generally to information security, and more specifically to threat detection within information systems.

BACKGROUND

In a network environment, devices are in data communication with other devices that may be distributed anywhere in the world. These network environments allow data and information to be shared among devices. Some of the technical challenges that occur when data is exchanged between devices are controlling data leakage, unauthorized access to data, and preventing malicious activities. Data storing devices, such as databases and servers, are vulnerable to attacks. This vulnerability poses several network security challenges. Existing systems are typically unable to detect a network attack until after the attack has occurred. This delayed response allows a bad actor to gain access to sensitive information within the network and/or allows bad actors to perform other malicious activities such as data exfiltration or uploading malware.

SUMMARY

The system disclosed in the present application provides a technical solution to the technical problems discussed above by leveraging machine learning to identify potential bad actors before a network attack occurs. The disclosed system provides several practical applications and technical advantages which include a process for proactively identifying bad actors based on their recent behavior and interactions with various network devices. This process improves the information security of the system by allowing the system to identify user behavior that is typically associated with a bad actor before a user is able to perform an attack on the network. This means that the system is able to protect the data within the network and to prevent a bad actor from performing any malicious activities by identifying bad actors before a network attack occurs. The disclosed system also includes a process for identifying potential network security threats or vulnerabilities within the network and implementing corrective network security actions to mitigate or prevent a network attack based on the identified network security threats. This process improves the information security of the system by allowing the system to identify any vulnerabilities within the network and to implement protective measures before an attack occurs.

Improving information security for the system also improves the underlying network and the devices within the network. For example, when a data exfiltration attack occurs, there is an increase in the amount of network resources and bandwidth that are consumed which reduces the throughput of the network. By preventing data exfiltration attacks, the system is able to prevent any unnecessary increases in the amount of network resources and bandwidth that are consumed that would otherwise negatively impact the throughput of the system. As another example, when a malware attack occurs, one or more devices within the network may be taken out of service until the malware can be removed from the devices. Taking devices out of service negatively impacts the performance and throughput of the network because the network has fewer resources for processing and communicating data. By preventing malware types of attacks, the system prevents any comprised devices from being taken out of service due to an attack that would otherwise negatively impact the performance and throughput of the network.

In one embodiment, the information security system comprises a network analysis device that is configured to receive user activity information that includes information about user interactions with a network device for multiple users. The network analysis device inputs the user activity information into a first machine learning model that is configured to receive user activity information and to output a set of bad actor candidates based on the user activity information. The network analysis device then filters the user activity information based on the set of bad actor candidates. The network analysis device inputs the filtered user activity information into a second machine learning model that is configured to receive the filtered user activity information and to output system exposure information that identifies network security threats. The network analysis device then identifies network security actions based on the network security threats and executes the network security actions.

In another embodiment, the information security system comprises a network analysis device that is configured to receive user activity information from a network device. The network analysis device inputs the user activity information into a machine learning model. The machine learning model is configured to receive user activity information and to output a set of bad actor candidates based on the user activity information. The network analysis device then receives the set of bad actor candidates from the machine learning model and outputs the set of bad actor candidates.

In another embodiment, the information security system comprises a network analysis device that is configured to receive user activity information. The network analysis device receives a set of bad actor candidates that identifies one or more users. The network analysis device filters the user activity information based on the set of bad actor candidates. The network analysis device then inputs the filtered user activity information into a machine learning model. The machine learning model is configured to receive the filtered user activity information and to output system exposure information that identifies network security threats. The network analysis device identifies network security actions based on the network security threats and executes the network security actions.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
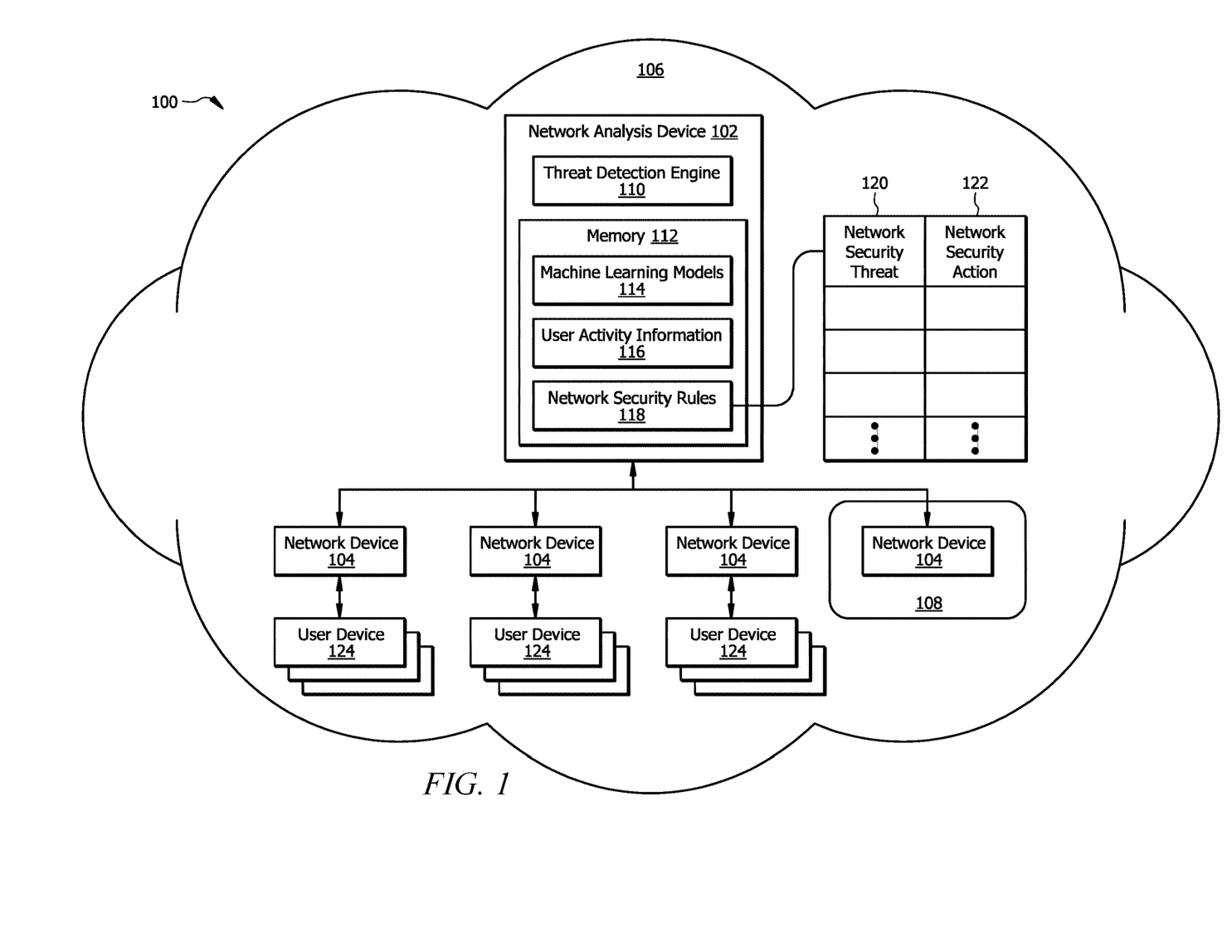
FIG. 1 is a schematic diagram of an embodiment of an information security system that is configured to provide network threat detection and prevention.

FIG. 1 is a schematic diagram of an embodiment of an information security system 100 that is configured to provide network threat detection and prevention. The information security system 100 is generally configured to analyze user activity information 116 that is associated with a group of users to determine whether any potential bad actors are present within the group of users based on their user activity information 116. This process improves the information security of the information security system 100 by allowing the information security system 100 to proactively identify user behavior that is typically associated with a bad actor before a user is able to perform an attack on the network 106. The information security system 100 is further configured to analyze the user activity information 116 that is associated with any potential bad actors to determine whether any potential network security threats 120 are present as well as corresponding network security actions 122 that can be performed to mitigate or prevent an attack within the network 106. This process improves the information security of the information security system 100 by allowing the information security system 100 to proactively identify any vulnerabilities within the network 106 and to implement protective measures before an attack occurs.

In one embodiment, the information security system 100 comprises a network analysis device 102, a plurality of network devices 104, and a plurality of user devices 124 that are in signal communication with each other over a network 106. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 106 may be configured to support any suitable type of communication protocol as would be appreciated by one of ordinary skill in the art.

Network Devices

Examples of network devices 104 include, but are not limited to, a computer, a server, a card reader, a database, or any other suitable type of network device. A network device 104 is generally configured to provide access to data or resources for a plurality of users. For example, a network device 104 may be a server or database that is configured to send data and receive data from a user's user device 124. Examples of user devices 124 include, but are not limited to, a smartphone, a tablet, a laptop, a computer, or any other suitable type of user device. As another example, a network device 104 may be a card reader that is configured to provide a user with access to a physical location (e.g. a server room or a file room). In other examples, a network device 104 may be any other suitable type of device that is configured to provide a user access to data or restricted information. Each network device 104 may be configured to communicate with one or more user devices 124 using any suitable type of wired or wireless communications.

Each network device 104 is further configured to collect user activity information 116 for users and to provide the user activity information 116 to the network analysis device 102 for processing. The user activity information 116 generally comprises information about user interactions with a network device 104. Examples of the user activity information 116 include, but are not limited to, web proxy logs, application usage logs, computer time usage logs, performance review information, network bandwidth usage logs, physical location access logs, or any other suitable type of information about a user's interactions with a network device 104. The user activity information 116 may also be configured to associate information about a user's interactions with a network device 104 with one or more unique identifiers for the user. Examples of identifiers include, but are not limited to, alphanumeric identifiers (e.g. employee numbers), email addresses, phone numbers, Internet Protocol (IP) addresses, Media Access Control (MAC) addresses, or any other suitable type of identifier. The network devices 104 may be configured to communicate and send the user activity information 116 to the network analysis device 102 using Application Programming Interfaces (APIs) or any other suitable type of communication technique.

Network Analysis Device

Examples of the network analysis device 102 include, but are not limited to, a server, a database, a computer, or any other suitable type of network device. In one embodiment, the network analysis device 102 comprises a threat detection engine 110 and a memory 112. Additional details about the hardware configuration of the network analysis device 102 are described in FIG. 3. The memory 112 is configured to store machine learning models 114, user activity information 116, network security rules 118, and/or any other suitable type of data.

The threat detection engine 110 is generally configured to identify potential bad actors from among a group of users based on the user activity information 116 that is associated with the users. The threat detection engine 110 is further configured to identify network security threats 120 based on the user activity information 116, to identify network security actions 122 for mitigating or preventing the identified network security threats 120, and to execute the identified network security actions 122. An example of the threat detection engine 110 is described in more detail below in FIG. 2.

The network security rules 118 are generally configured to provide a mapping between network security threats 120 and network security actions 122. In FIG. 1, the network security rules 118 are shown in a table data structure. In other examples, the network security rules 118 may be implemented using any other suitable type of data structure. The network security threats 120 identify types of attack that the information security system 100 is vulnerable to. Examples of network security threats 120 include, but are not limited to, data exfiltration attacks, unauthorized access attacks, malware attacks, or any other suitable type of attack. The network security actions 122 identify commands or instructions for mitigating a network security threat 120. Examples of network security actions 122 include, but are not limited to, restriction access to a website, restricting or limiting outgoing data for a user, restricting access to a network device 104, restricting access to a physical location, restricting access to an application, modifying network settings on a user device 124, modifying permission settings for a user, or any other suitable type of action that mitigates or prevents a network security threat 120.

Examples of machine learning models 114 include, but are not limited to, a multi-layer perceptron or any other suitable type of neural network model. In one embodiment, the machine learning models 114 comprise a first machine learning model 114 that is generally configured to receive user activity information 116 for a group of users as an input and to output a set of bad actor candidates based on the provided user activity information 116. The set of bad actor candidates identifies one or more users from among the group of users that may be associated with malicious or suspicious activities within the network 106. The first machine learning model 114 is trained using training data that comprises information about different types of user activity information 116. During the training process, the first machine learning model 114 determines weights and bias values that allow the first machine learning model 114 to map certain types of malicious or suspicious user activity information 116 to users that are bad actor candidates. Through this process, the first machine learning model 114 is able to identify how to identify potential bad actors based on user activity information 116.

The machine learning models 114 may further comprise a second machine learning model 114 that is generally configured to receive user activity information 116 that is associated with the set of bad actor candidates as an input and to output system exposure information based on the provided user activity information 116. The system exposure information identifies one or more network security threats 120 that may be present based on the provided user activity information 116 for the set of bad actor candidates. The second machine learning model 114 is trained using training data that comprises information about different types of user activity information 116. During the training process, the second machine learning model 114 determines weights and bias values that allow the second machine learning model 114 to map certain types of malicious or suspicious user activity information 116 to network security threats 120. Through this process, the second machine learning model 114 is able to identify how to identify potential network security threats 120 based on user activity information 116.

In some embodiments, the functionality of the first machine learning model 114 may be combined with the functionality of the second machine learning model 114 into a single machine learning model 114 that is configured to receive user activity information 116 as an input and to output a set of bad actor candidates and system exposure information based on the provided user activity information 116. The threat detection engine 110 may be configured to train the machine learning models 114 using any suitable technique as would be appreciated by one of ordinary skill in the art. In some embodiments, the machine learning models 114 may be stored and/or trained by a device that is external from the network analysis device 102.

Threat Detection and Prevention Process

Figure 2:
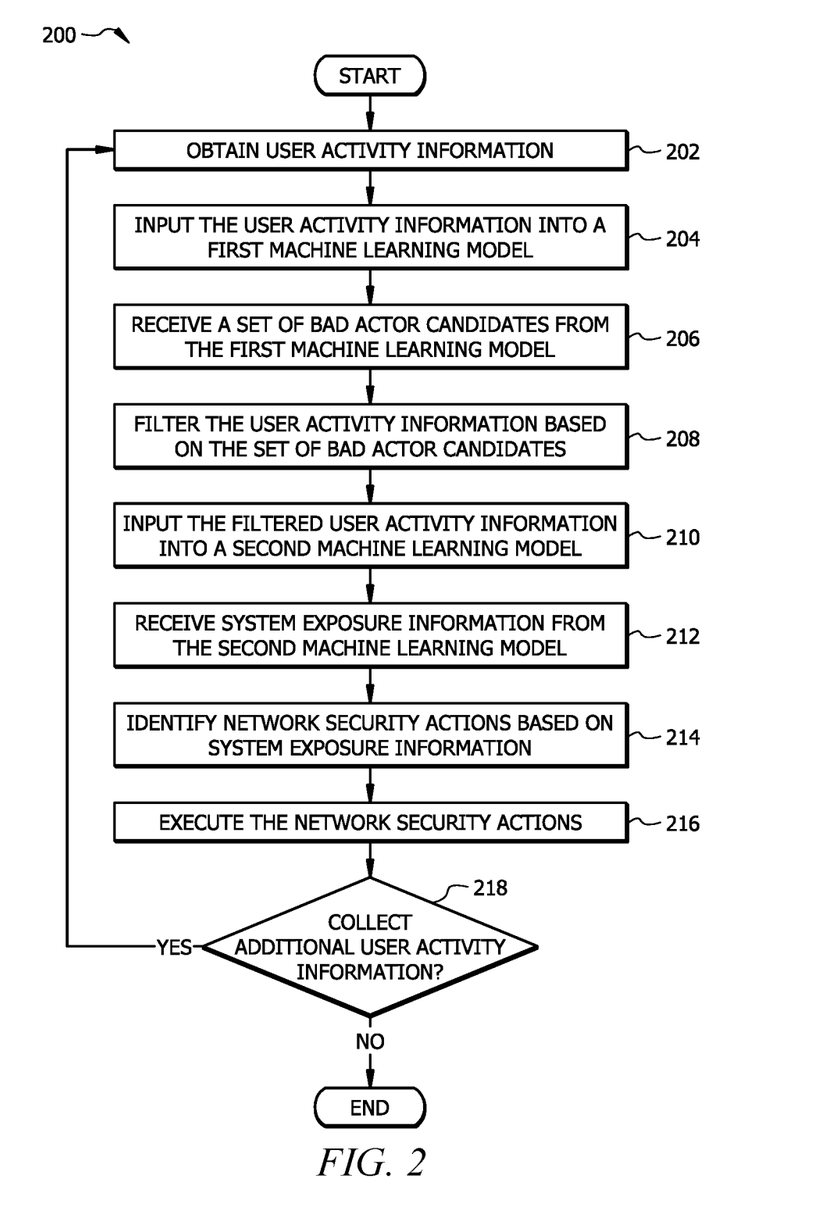
FIG. 2 is a flowchart of an embodiment of a threat detection process for the information security system.

FIG. 2 is a flowchart of an embodiment of a threat detection process 200 for an information security system 100. The information security system 100 may employ process 200 to analyze user activity information 116 that is associated with a group of users to determine whether any potential bad actors are present within the group of users based on their user activity information 116. This process allows the information security system 100 to proactively identify user behavior that is typically associated with a bad actor before a user is able to perform an attack on the network 106. The information security system 100 may also employee process to further analyze the user activity information 116 that is associated with any potential bad actors to determine whether any potential network security threats 120 are present as well as corresponding network security actions 122 that can be performed to mitigate or prevent an attack within the network 106. This process allows the information security system 100 to proactively identify any vulnerabilities within the network 106 and to implement protective measures before an attack occurs.

At step 202, the network analysis device 102 obtains user activity information 116 for a group of users from one or more network devices 104. As an example, the user activity information 116 may identify websites, applications, physical locations, and/or network devices 104 that were accessed by a user. In other examples, the user activity information 116 may identify an amount of outgoing data for a user, security violations that are associated with users, failed log-in attempts that were performed by a user, or any other suitable type of information that is associated with a user.

At step 204, the network analysis device 102 inputs the user activity information into the first machine learning model 114. Here, the network analysis device 102 inputs at least a portion of the user activity information 116 into the first machine learning model 114. The first machine learning model 114 was previously trained to map certain types of malicious or suspicious user activity information 116 to users that are bad actor candidates.

At step 206, the network analysis device 102 receives a set of bad actor candidates from the first machine learning model 114. In response to inputting the user activity information 116 into the first machine learning model 114, the network analysis device 102 obtains a set of bad actor candidates. The set of bad actor candidates identifies one or more users from among the group of users that may be associated with malicious or suspicious activities within the network 106. As an example, the first machine learning model 114 may be trained to identify users that accessed web sites from among a list of malicious websites. In this example, the first machine learning model 114 may identify the users that have accessed malicious web sites as bad actor candidates. As another example, the first machine learning model 114 may be trained to identify an average amount of outgoing data for a group of users and to identify users that exceed the average amount of data for the group of users. In this example, the first machine learning model 114 identifies users that are exceeding the average or typical amount of outgoing data as bad actor candidates. As another example, the first machine learning model 114 may be trained to identify security violations based on the user activity information 116 and to identify users that are associated with the security violations. In this example, the first machine learning model 114 identifies the users that are associated with the security violations as bad actor candidates. In other examples, the first machine learning model 114 may be trained to identify bad actor candidates based on any other suitable type or combination of criteria.

At step 208, the network analysis device 102 filters the user activity information 116 based on the set of bad actor candidates. Here, the network analysis device 102 filters the user activity information 116 to remove user activity information 116 for any users that are not members of the set of bad actor candidates. By filtering the user activity information 116, the network analysis device 102 isolates the information that is associated with the users that have been identified as a potential bad actor. The filtered user activity information 116 can then be used for further processing to identify any network security threats 120 that may be present based on the user activity information 116 that is associated with the bad actor candidates.

At step 210, the network analysis device 102 inputs the filtered user activity information 116 into the second machine learning model 114. The network analysis device 102 inputs the filtered user activity information 116 into the second machine learning model 114. The second machine learning model 114 was previously trained to map certain types of malicious or suspicious user activity information 116 to network security threats 120.

At step 212, the network analysis device 102 receives system exposure information from the second machine learning model 114. In response to inputting the user activity information 116 into the second machine learning model 114, the network analysis device 102 obtains system exposure information. The system exposure information identifies one or more network security threats 120 that may be present based on the provided filtered user activity information 116 for the set of bad actor candidates.

At step 214, the network analysis device 102 identifies network security actions 122 based on the system exposure information. The network analysis device 102 uses the network security rules 118 to identify network security actions 122. For example, the network analysis device 102 may use the network security threats 120 identified in the system exposure information as a search token to identify corresponding network security actions 122.

At step 216, the network analysis device 102 executes the network security actions 122. Here, the network analysis device 102 may send commands or instructions to a network device 104 and/or a user device 124 to modify the settings of the network device 104 and user device 124 to implement the identified network security actions 122. For example, the network analysis device 102 may identify a website from within the filtered user activity information 116 and identify a user from among the bad actor candidates that accessed the website. The network analysis device 102 may then send commands or instructions to the user device 124 and/or a network device 104 to change network settings to restrict the user's future access to the website. In this example, the network analysis device 102 restricts the user from access the website to prevent the user from performing any malicious activities using the website.

As another example, the network analysis device 102 may send commands or instructions to a user device 124 and/or a network device 104 to modify network settings to restrict or block outgoing data for the user. In this example, the network analysis device 102 restrict or block outgoing data for the user to mitigate or prevent data exfiltration.

As another example, the network analysis device 102 may send commands or instructions to a user device 124 and/or a network device 104 to modify network settings to restrict or block access to one or more network device 104 for the user. In this example, the network analysis device 102 prevents the user from access data on the network device 104 or from using the network device 104 to perform malicious activities.

As another example, the network analysis device 102 may send commands or instructions to a user device 124 and/or a network device 104 to modify permission settings for the user device 124 that is associated with the user. In this example, the network analysis device 102 may modify the permission settings for the user to prevent the user from performing certain operations on their user device 124 such as installing new software or modifying network settings.

As another example, the network analysis device 102 may send commands or instructions to a user device 124 and/or a network device 104 to restrict access to a physical location for the user. For instance, the network analysis device 102 may send commands or instructions to a card reader to revoke a user's access to a physical location. In other examples, the network analysis device 102 may send commands or instructions to any other suitable type of network device 104 to restrict the user's ability to access a physical location.

As another example, the network analysis device 102 may send commands or instructions to a user device 124 and/or a network device 104 to modify settings on the user device 124 that is associated with the user. In this example, the network analysis device 102 may modify the user device 124 settings to restrict access to one or more applications for the user. In other examples, the network analysis device 102 may send commands or instructions to a user device 124 and/or a network device 104 to restrict or block access to any other suitable type of data for the user.

At step 218, the network analysis device 102 determines whether to collect additional user activity information 116 for processing. In one embodiment, the network analysis device 102 may be configured to periodically collect additional user activity information 116. For example, the network analysis device 102 may be configured to collect additional user activity information 116 every thirty minutes, every hour, every two hours, or at any other suitable time interval. In this case, the network analysis device 102 may remain at step 218 until the predetermined time interval has elapsed. In some embodiments, the network analysis device 102 may be configured to collect additional user activity information 116 on demand. In this case, the network analysis device 102 checks whether any commands or instructions have been received to collect additional user activity information 116.

The network analysis device 102 returns to step 202 in response to determining to collect additional user activity information 116. In this case, the network analysis device 102 returns to step 202 to collect additional user activity information 116 to process. Otherwise, the network analysis device 102 terminates process 200.

Hardware Configuration for a Network Analysis Device

Figure 3:
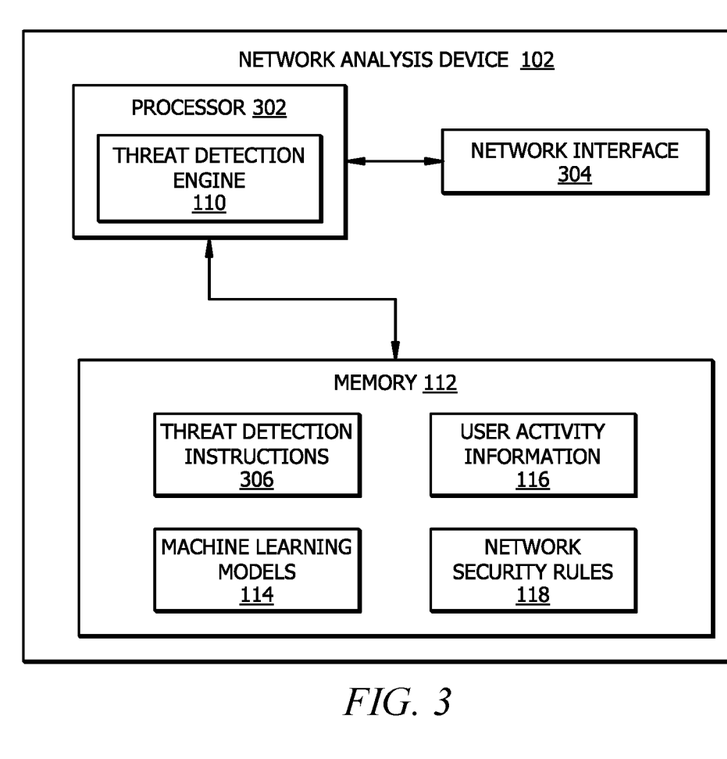
FIG. 3 is an embodiment of a network analysis device configured to use threat detection and prevention for the information security system.

FIG. 3 is an embodiment of a network analysis device 102 of an information security system 100. As an example, the network analysis device 102 comprises a processor 302, a memory 112, and a network interface 304. The network analysis device 102 may be configured as shown or in any other suitable configuration.

Processor

The processor 302 comprises one or more processors operably coupled to the memory 112. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 112 and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute threat detection instructions 306 to implement the threat detection engine 110. In this way, processor 302 may be a special-purpose computer designed to implement the functions disclosed herein. In an embodiment, the threat detection engine 110 is implemented using logic units, FPGAs, ASICs, DSPs, or any other suitable hardware. The threat detection engine 110 is configured to operate as described in FIGS. 1 and 2. For example, the threat detection engine 110 may be configured to perform the steps of process 200 as described in FIG. 2.

Memory

The memory 112 is operable to store any of the information described above with respect to FIGS. 1 and 2 along with any other data, instructions, logic, rules, or code operable to implement the function(s) described herein when executed by the processor 302. The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store threat detection instructions 306, machine learning models 114, user activity information 116, network security rules 118, and/or any other data or instructions. The threat detection instructions 306 may comprise any suitable set of instructions, logic, rules, or code operable to execute the threat detection engine 110. The machine learning models 114, the user activity information 116, and the network security rules 118 are configured similar to the machine learning models 114, the user activity information 116, and the network security rules 118 described in FIGS. 1-2, respectively.

Network Interface

The network interface 304 is configured to enable wired and/or wireless communications. The network interface 304 is configured to communicate data between network devices 104 and other devices, systems, or domains. For example, the network interface 304 may comprise a near-field communication (NFC) interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network analysis device, comprising:
a memory operable to store network security rules, wherein the network security rules map network security threats to network security actions, wherein the network security actions comprise instructions for modifying device settings; and
a processor operably coupled to the memory, and configured to:
receive user activity information that comprises information about user interactions with a network device for a plurality of users, wherein at least a portion of the user activity information for the plurality of users comprises malicious or suspicious user activities;
determine a set of bad actor candidates from the plurality of users based on the user activity information for the plurality of users, wherein the set of bad actor candidates identifies one or more users from among the plurality of users that are associated with the malicious or suspicious user activities;
filter the user activity information based on the set of bad actor candidates, wherein filtering the user activity information comprises removing user activity information for users that are not members of the set of bad actor candidates;
input the filtered user activity information into a machine learning model, wherein the machine learning model is configured to:
receive the filtered user activity information; and
output system exposure information based on the user activity information, wherein the system exposure information identifies one or more network security threats;
identify one or more network security actions within the network security rules based on the one or more network security threats identified in the system exposure information; and
execute the one or more network security actions.

2. The device of claim 1, wherein executing the one or more network security actions comprises:
identifying a website from within the filtered user activity information; and
identifying a user that visited the website from among the set of bad actor candidates;
restricting access to the website for the user.

3. The device of claim 1, wherein executing the one or more network security actions comprises modifying settings for a user device that is associated with the user, wherein modifying the settings comprises restricting outgoing data for the user.

4. The device of claim 1, wherein executing the one or more network security actions comprises modifying network settings for a user device that is associated with the user, wherein modifying the network settings comprises restricting access to a second network device.

5. The device of claim 1, wherein executing the one or more network security actions comprises modifying permission settings for a user device that is associated with the user.

6. The device of claim 1, wherein executing the one or more network security actions comprises restricting access to a physical location for a user.

7. The device of claim 1, wherein executing the one or more network security actions comprises modifying settings for a user device that is associated with the user, wherein modifying the settings comprises restricting access to an application for the user.

8. A threat detection method, comprising:
    receiving user activity information that comprises information about user interactions with a network device for a plurality of users, wherein at least a portion of the user activity information for the plurality of users comprises malicious or suspicious user activities;
    determining a set of bad actor candidates from the plurality of users based on the user activity information for the plurality of users, wherein the set of bad actor candidates identifies one or more users from among the plurality of users that are associated with the malicious or suspicious user activities;
    filtering the user activity information based on the set of bad actor candidates, wherein filtering the user activity information comprises removing user activity information for users that are not members of the set of bad actor candidates;
    inputting the filtered user activity information into a machine learning model, wherein the machine learning model is configured to:
        receive the filtered user activity information; and
        output system exposure information based on the user activity information, wherein the system exposure information identifies one or more network security threats;
    identifying one or more network security actions based on the one or more network security threats identified in the system exposure information, wherein the one or more network security actions comprise instructions for modifying device settings; and
    executing the one or more network security actions.

9. The method of claim 8, wherein executing the one or more network security actions comprises:
    identifying a website from within the filtered user activity information;
    identifying a user that visited the website from among the set of bad actor candidates; and
    restricting access to the website for the user.

10. The method of claim 8, wherein executing the one or more network security actions comprises modifying settings for a user device that is associated with the user, wherein modifying the settings comprises restricting outgoing data for the user.

11. The method of claim 8, wherein executing the one or more network security actions comprises modifying network settings for a user device that is associated with the user, wherein modifying the network settings comprises restricting access to a second network device.

12. The method of claim 8, wherein executing the one or more network security actions comprises modifying permission settings for a user device that is associated with the user.

13. The method of claim 8, wherein executing the one or more network security actions comprises restricting access to a physical location for a user.

14. The method of claim 8, wherein executing the one or more network security actions comprises modifying settings for a user device that is associated with the user, wherein modifying the settings comprises restricting access to an application for the user.

15. A non-transitory computer-readable medium storing instructions that, when executed by a processor, cause the processor to:
    receive user activity information that comprises information about user interactions with a network device for a plurality of users, wherein at least a portion of the user activity information for the plurality of users comprises malicious or suspicious user activities;
    determine a set of bad actor candidates from the plurality of users based on the user activity information for the plurality of users, wherein the set of bad actor candidates identifies one or more users from among the plurality of users that are associated with the malicious or suspicious user activities;
    filter the user activity information based on the set of bad actor candidates, wherein filtering the user activity information comprises removing user activity information for users that are not members of the set of bad actor candidates;
    input the filtered user activity information into a machine learning model, wherein the machine learning model is configured to:
        receive the filtered user activity information; and
        output system exposure information based on the user activity information, wherein the system exposure information identifies one or more network security threats;
    identify one or more network security actions based on the one or more network security threats identified in the system exposure information, wherein the one or more network security actions comprise instructions for modifying device settings; and
    execute the one or more network security actions.

16. The non-transitory computer-readable medium of claim 15, wherein executing the one or more network security actions comprises:
    identifying a website from within the filtered user activity information;
    identifying a user that visited the website from among the set of bad actor candidates; and
    restricting access to the website for the user.

17. The non-transitory computer-readable medium of claim 15, wherein executing the one or more network security actions comprises modifying settings for a user device that is associated with the user, wherein modifying the settings comprises restricting outgoing data for the user.

18. The non-transitory computer-readable medium of claim 15, wherein executing the one or more network security actions comprises modifying network settings for a user device that is associated with the user, wherein modifying the network settings comprises restricting access to a second network device.

19. The non-transitory computer-readable medium of claim 15, wherein executing the one or more network security actions comprises restricting access to a physical location for a user.

20. The non-transitory computer-readable medium of claim 15, wherein executing the one or more network security actions comprises modifying settings for a user device that is associated with the user, wherein modifying the settings comprises restricting access to an application for the user.

\* \* \* \* \*